G. B. DUSINBERRE.
CLIP.
APPLICATION FILED DEC. 17, 1917.
1,402,153. Patented Jan. 3, 1922.
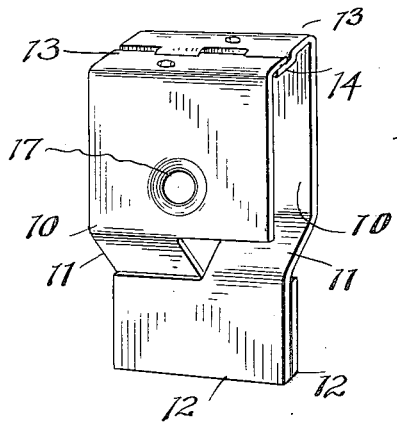
Fig. 1.
Fig. 2. Fig. 3. Fig. 4.
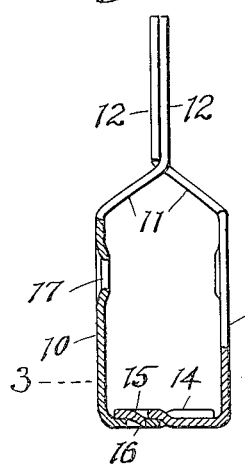 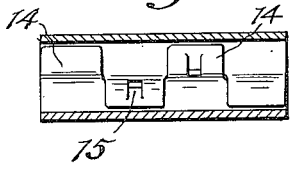 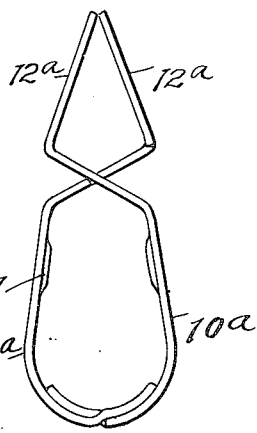
Fig. 5.
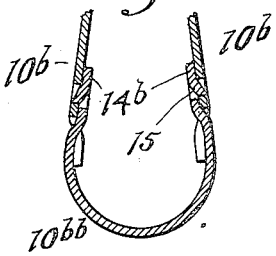
Fig. 6. Fig. 7.
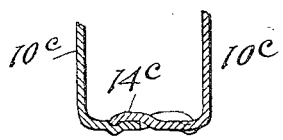 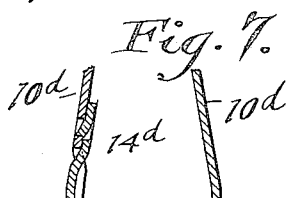
Inventor
George B. Dusinberre
By Thurston & Kwis
attys

UNITED STATES PATENT OFFICE.

GEORGE B. DUSINBERRE, OF CLEVELAND, OHIO.

CLIP.

1,402,153.

Specification of Letters Patent.   Patented Jan. 3, 1922.

Application filed December 17, 1917. Serial No. 207,425.

*To all whom it may concern:*

Be it known that I, GEORGE B. DUSINBERRE, a citizen of the United States, residing at Cleveland, in the county of Cuyahoga and State of Ohio, have invented a certain new and useful Improvement in Clips, of which the following is a full, clear, and exact description.

This invention relates to spring clips capable of being used for a variety of purposes such as a paper clip, test clip for electrical purposes, or for holding other articles. In certain respects this clip is an improvement over the construction shown in my prior application, Serial No. 147,364, filed February 8, 1917.

The principal object of the present invention is to provide an improved clip having crossed portions forming jaws which are held together by the inherent resiliency of the material of one or all the parts, without the necessity for auxiliary springs to impose the tension. Further the invention aims to provide a clip which is efficient and inexpensive, and which is placed and held under tension by the assembling of the parts without the necessity for deforming any of the parts, and without requiring screws, rivets, or equivalent holding or fastening means.

Still further the invention aims to provide a clip having counterpart members which are not only placed under tension when the parts are assembled, but are automatically locked by the mere act of assembling, against relative displacement or disalignment.

The clip involving the present invention is preferably formed of two parts, one or both of which may be made of resilient material, or in a modified form of three parts, in which event the two main members forming the jaws may or may not be formed of resilient material, and the third part which forms the rear end of the clip and is joined to the rear ends of the main members will be formed of resilient material to place the jaws under tension. The principal feature however, of the clip, whether formed of two or three members, resides in the manner in which the clip members are united and locked, this being accomplished by interlacing, so to speak, the members at the rear end of the clip, so as to hold the parts under tension, and by providing an automatic interlock consisting of one or more sets of spring tongues and recesses or openings into which the tongue or tongues spring when the parts are brought into their normal relationship, this interlock preventing disengagement and permanently holding the parts together without the necessity for deformation or for any auxiliary fastening means.

The invention may be further briefly summarized as consisting in certain novel details of construction and combinations and arrangements of parts which will be described in the specification and set forth in the appended claims.

In the accompanying sheet of drawings wherein I have shown several slightly different forms of my invention, Fig. 1 is a perspective view of a clip formed in accordance with my invention; Fig. 2 is an edge view of the same, partly in section; Fig. 3 is a transverse sectional view substantially along the line 3—3 of Fig. 2, looking toward the rear end of the clip; Fig. 4 is a view similar to Fig. 2, showing a modification in the shape of the clip; Fig. 5 is a sectional view of the rear portion of a clip composed of three parts instead of two; Fig. 6 is a sectional view through the rear portion of a clip of the general form shown in Fig. 2, but showing a slight modification in the form of automatic interlock; and Fig. 7 is a similar view showing a clip with a rounded rear end as in Figs. 4 and 5, but with interlaced parts located at a different point.

In the preferred form of my invention, the clip is formed of two counterpart or similar members, 10, 10, with crossed portions 11 at the free ends of which are jaws 12, which are held together by the resiliency of the material, preferably metal. I prefer that both parts be formed of resilient material, but a satisfactory clip can be formed with one part only of resilient material. The crossing of the two members is preferably made possible by notching each member from one edge inwardly to about the center, as clearly shown in Fig. 1. In Figs. 1 and 2 the jaws 12 are flat, and are in engagement for their full length, although this is not at all essential as they may be otherwise shaped, as for example, as shown in Fig. 4. The rear or body portion of the clip in Figs. 1 and 2 is shown substantially rectangular in form, but this is not essential, as will be apparent from an inspection of Figs. 4, 5 and 7, but on the other hand, the shape can be made anything desired as long as it does not interfere with the assembling and uniting of the parts in the manner hereinafter described, and providing further, that the two members just at the rear of the crossed portions are normally spaced apart so that they can be pressed together or toward each other to spread the jaws.

As before stated, the principal feature of the invention resides in the manner in which the parts are brought into normal position and are held under tension against displacement. As shown in Figs. 1, 2 and 3, the rear ends 13 of the clip members 10, 10, are bent at nearly right angles to the main or body portions of these members, and the rear ends are provided each with one or more, preferably two, or in the event the clip is quite wide, with more than two tongues 14. To assemble this clip the portions 11 are crossed, and the jaws are placed together or in engagement, and then the rear portions are moved toward each other, and the toothed or tongued rear ends are interlaced with the tongue or tonges on each part slightly sprung and passed on the inside of the rear end of the other part. When the parts are thus moved together they are placed under tension so that the jaws if spread apart, tend to spring together. As a further feature to prevent disengagement of the rear ends of the clip, that is, of the interlaced parts, an automatic interlock is provided consisting preferably of auxiliary spring tongues or detents 15, which may be, and preferably are located in the tongues 14, one auxiliary tongue or detent 15 being preferably provided in at least one tongue 14 of each part, and the companion part having an appropriately located opening or recess 16 into which the detent 15 will spring when the tongued rear ends are slid together or interlaced and moved to their normal positions. By the snapping of the auxiliary tongues or detents 15 into the openings or recesses 16, the interlaced rear ends of the clip members 10 are locked against accidental displacement.

Points to be borne in mind are, that these two members 10, 10, are exactly similar in form or shape so that both parts can be stamped from one set of dies, and that the two parts of the clip can be easily and quickly assembled, and when assembled, the jaws are under tension and the parts are held together against accidental displacement without requiring securing devices such as screws or rivets, and without deforming either part after the parts are assembled.

A further advantage of a clip of this form is that for a given length of clip, maximum tension is obtained, due largely to the fact that the tension is imposed by the interlaced rear ends which do not add materially to the length of the clip.

As before stated, the shape or design of the clip can be modified. By way of illustration of this point I have shown in Fig. 4 a somewhat similar clip composed of the two parts $10^a$, $10^a$, with crossed portions as in Figs. 1 and 2, and with tapered jaw portions $12^a$, $12^a$, which engage only at their front ends. Additionally the rear end of the clip is rounded, the rear ends of the two parts $10^a$, $10^a$, being interlaced and automatically locked together precisely as in the first construction.

In Fig. 5 a further modification is shown in the respect that in addition to the two main clip members, $10^b$, $10^b$, a third clip member $10^{bb}$ is employed. While this construction is not as desirable as those first described, it has certain advantages. For example, the parts $10^b$, $10^b$, may be formed of non-resilient material, and the part $10^{bb}$ of resilient material. The ends of the parts are provided with tongues $14^b$ similar to the tongues 14 of the prior constructions, and these tongues are interlaced to place the jaws under tension, and in addition the interlaced parts have the automatic interlock such as first described.

In Fig. 6 is shown a construction which in the main is like Fig. 2, but differs therefrom simply in the automatic interlock. This clip is composed of the two parts $10^c$, $10^c$, whose rear ends are provided with tongues and are interlaced as previously described. Instead of providing auxiliary tongues or detents for the interlock, such as shown at 15 in Figs. 1 to 5, the rear ends of the interlaced tongues $14^c$ are shaped at their free ends to snap into depressions formed in the ends of the two members.

In Fig. 7 is shown a clip composed of two parts $10^d$, $10^d$, having interlaced end portions with interlacing tongues $14^d$, the clip here shown differing from that of Fig. 4 only in the respect that the interlaced parts are not located at the rear end of the clip but at one side of the clip.

In all forms of the clip, the two clip members 10, or $10^a$, etc., are provided with alined openings 17 which will admit of the clip being suspended on a nail or the like. I prefer to locate these openings just at the rear of the crossed portions and to bevel inwardly the metal around the openings so as to provide convenient points at which the clip may be engaged between the thumb and index finger to spread the jaws of the clip.

It will be seen from the above, that a clip embodying my invention is capable of being modified in many different respects, and while I have shown several modifications, I wish it understood that I have not attempted to illustrate all the modifications of which the clip is susceptible, and I therefore aim in my claims to cover all modifications which do not involve a departure from the spirit and scope of my invention in its broadest aspect.

Having described my invention, what I claim, is:

1. A spring clip having crossed portions and jaws which are held together by the resiliency of the material, said clip composed of separate members connected and held together to impose tension in the jaws by portions of one part extending under and over portions of the companion part connected to it.

2. A spring clip having crossed portions and jaws which are held together by the resiliency of the material, said clip composed of parts having relatively fixed portions which are interlaced to impose tension in the clip and to hold the parts in fixed relation and are assembled by sliding one relative to the other.

3. A spring clip having crossed portions and jaws which are held together by the resiliency of the material, said clip composed of parts having relatively fixed portions which are interlaced to impose tension in the jaws and to hold the parts in relatively fixed relation and a tongue and recess interlock for automatically locking the parts against displacement.

4. A clip composed of two members having crossing portions forming jaws which are held together by the inherent resiliency of the materials, said members having their rear ends relatively fixed and interlaced to impose tension in the jaws and to hold the parts in relatively fixed relation by one or more portions at the rear end of each member sprung under the rear end of the other member.

5. A spring clip composed of two members having crossing portions forming jaws which are held together by the inherent resiliency of the material, the rear ends of the two members having relatively fixed portions which are interlaced to hold the parts in relatively fixed relation through the medium of tongues on each part extending under the other part.

6. A spring clip composed of two members having crossed portions and jaws which are held together by the inherent resiliency of the material, and having at their rear ends relatively fixed portions which are overlapped to hold the parts in relatively fixed relation by moving the rear ends toward each other and causing portion or portions of each part to pass under the rear end of the companion part.

7. A spring clip composed of two members having crossed portions and jaws which are held together by the inherent resiliency of the material, and having at their rear ends portions which are overlapped to hold the parts in relatively fixed relation by moving the rear ends toward each other and causing portion or portions of each part to pass under the rear end of the companion part, and means on the two parts automatically interlocking when the parts are moved into normal position so as to prevent disengagement of the parts.

8. A spring clip composed of two members having crossed portions and jaws which are held together by the inherent resiliency of the material, and having at their rear ends portions which are overlapped by moving the rear ends toward each other and causing portion or portions of each part to pass under the rear end of the companion part, and an automatic interlock for preventing disengagement of the parts, comprising a tongue on each part which snaps into a recess of the companion part when the two parts are moved to normal position.

In testimony whereof, I hereunto affix my signature.

GEORGE B. DUSINBERRE.